US008273205B2

(12) United States Patent
Murgida

(10) Patent No.: US 8,273,205 B2
(45) Date of Patent: Sep. 25, 2012

(54) MANUFACTURE OF PIVOTING RESILIENT SKIN CONTACTING MEMBERS

(75) Inventor: Matthew Frank Murgida, Somerville, MA (US)

(73) Assignee: The Gillette Company, Boston, MA (US)

(*) Notice: Subject to any disclaimer, the term of this patent is extended or adjusted under 35 U.S.C. 154(b) by 259 days.

(21) Appl. No.: 12/508,857

(22) Filed: Jul. 24, 2009

(65) Prior Publication Data

US 2011/0017387 A1 Jan. 27, 2011

(51) Int. Cl.
*B29C 45/13* (2006.01)
*B29C 45/14* (2006.01)
*B26B 19/42* (2006.01)
*B26B 21/52* (2006.01)

(52) U.S. Cl. ........ 156/242; 156/245; 264/248; 264/249; 264/261; 264/328.8; 30/34.2; 30/527; D28/47; D28/48

(58) Field of Classification Search .................... 30/524, 30/527, 34.2, 526, 531; D28/46, 47, 48; *B26B 19/42, 21/52*
See application file for complete search history.

(56) References Cited

U.S. PATENT DOCUMENTS

| | | | | |
|---|---|---|---|---|
| 2,406,984 | A * | 9/1946 | Anderson | 30/534 |
| 4,413,411 | A | 11/1983 | Trotta | |
| 4,446,619 | A | 5/1984 | Jacobson | |
| 4,778,640 | A | 10/1988 | Braun et al. | |
| 5,053,178 | A | 10/1991 | Butlin et al. | |
| 5,113,585 | A * | 5/1992 | Rogers et al. | 30/41 |
| 5,318,429 | A | 6/1994 | Butlin et al. | |
| 5,560,106 | A * | 10/1996 | Armbruster et al. | 30/527 |
| 5,689,883 | A * | 11/1997 | Ortiz et al. | 30/34.2 |
| 5,787,586 | A * | 8/1998 | Apprille et al. | 30/47 |
| 5,822,869 | A | 10/1998 | Metcalf et al. | |
| 5,934,762 | A * | 8/1999 | Vrignaud | 300/21 |
| 5,956,851 | A | 9/1999 | Apprille et al. | |
| 6,026,577 | A | 2/2000 | Ferraro | |
| 6,550,141 | B1 * | 4/2003 | Rivers et al. | 30/50 |
| 6,612,040 | B2 * | 9/2003 | Gilder | 30/530 |

(Continued)

FOREIGN PATENT DOCUMENTS

DE 101 53 491 A1 11/2002

(Continued)

OTHER PUBLICATIONS

Brandrup, J., Immergut, E.H., and E.A. Grulke, Polymer Handbook, Fourth Edition, 1999, pp. V/27 and V/164-V/169.*

(Continued)

*Primary Examiner* — William Bell
(74) *Attorney, Agent, or Firm* — John M. Lipchitz; Kevin C. Johnson; Steven C. Miller

(57) ABSTRACT

A molding process for forming a wet shaving razor including the step of placing one or more of the blades into a first mold cavity. A first generally rigid polymer is injected into the first mold cavity to form a housing and to secure the blades. A second generally rigid polymer is injected into a second mold cavity to form a handle that is adjacent to and spaced apart from the housing of the first mold cavity. A generally flexible polymer is injected into a third mold cavity to interconnect the housing and the handle, wherein the generally flexible polymer forms a gripping portion on the handle and a resilient skin contacting element between the housing and the handle.

15 Claims, 12 Drawing Sheets

U.S. PATENT DOCUMENTS

| | | | |
|---|---|---|---|
| 6,839,968 B2 | 1/2005 | Brown, Jr. et al. | |
| 6,852,262 B2 | 2/2005 | Brown, Jr. et al. | |
| 7,100,284 B2 * | 9/2006 | King | 30/49 |
| 2010/0205808 A1 | 8/2010 | King | |

FOREIGN PATENT DOCUMENTS

| | | |
|---|---|---|
| EP | 1 488 894 A1 | 12/2004 |
| WO | WO 9823417 A1 * | 6/1998 |

OTHER PUBLICATIONS

PCT International Search Report with Written Opinion in corresponding Int'l appln. PCT/US2010/041954 dated Nov. 17, 2010.

* cited by examiner

MANUFACTURE OF PIVOTING RESILIENT SKIN CONTACTING MEMBERS

FIELD OF THE INVENTION

The present invention relates to wet shaving razors, and more particularly, to wet shaving razors having a handle, and a housing with a resilient skin contacting element for facilitating stretching of skin and pivoting of the housing relative to the handle, and methods of making the same.

BACKGROUND OF THE INVENTION

In general, shaving razors of the wet shave type include a cartridge or blade unit with at least one blade with a cutting edge which is moved across the surface of the skin being shaved by means of a handle to which the cartridge is attached. The cartridge may be mounted detachably on the handle to enable the cartridge to be replaced by a fresh cartridge when the blade sharpness has diminished to an unsatisfactory level, or it may be attached permanently to the handle with the intention that the entire razor be discarded when the blade or blades have become dulled (i.e., disposable razor). The connection of the cartridge to the handle provides a pivotal mounting of the cartridge with respect to the handle so that the cartridge angle adjusts to follow the contours of the surface being shaved. In such systems, the cartridge can be biased toward a rest position by the action of a spring-biased plunger (a cam follower) carried on the handle against a cam surface on the cartridge housing. Razor cartridges usually include a guard which contacts the skin in front of the blade(s) and a cap for contacting the skin behind the blade(s) during shaving. The cap and guard aid in establishing the so-called "shaving geometry", i.e., the parameters which determine the blade orientation and position relative to the skin during shaving, which in turn have a strong influence on the shaving performance and efficacy of the razor. The guard may be generally rigid, for example formed integrally with a frame or platform structure which provides support for the blades.

In recent years shaving razors with numerous blades have been proposed in the literature and commercialized, i.e., in U.S. Pat. Pub. 2005/0039337 A1 published on Feb. 24, 2005, which generally describes a type of design that has been commercialized globally as the five bladed Fusion™ razor by The Gillette Company. In general, additional blades provide a closer shave, but increase drag against the surface of the skin, which may result in discomfort to the user. To compensate for the increased drag caused by the increased number of blades, shaving aids (i.e., a lubricant, whisker softener, razor cleanser, medicinal agent, cosmetic agent or combination thereof), have been incorporated into razors, for example by incorporating a shaving aid into one or more extruded or molded polymeric components of the razor. Such shaving aid composites may be mounted on a cap behind the blades and/or on guard structures in front of the blades of the razor cartridge to decrease friction and drag.

Various guard structures have been developed to improve the stretching of the skin in front of the blades. These guard structures have also increased in size to provide improved stretching of the skin and compensate for the general desire of increased lubrication. The additional blades, larger guard structures and the addition of lubrication strips in front of and/or behind the blades have increased the manufacturing cost and the overall size of the cartridge, especially the footprint of the cartridge (the surface area of the cartridge that is in contact with the skin during shaving). In general, a smaller footprint is preferred by consumers to maneuver the cartridge around smaller areas of the face, such as around the nose and chin. Furthermore, some consumers prefer the look of a neatly contoured mustache or beard. Larger cartridges make it difficult to accurately contour facial hair because the cartridge blocks the view of the user from the area being shaved or trimmed.

SUMMARY OF THE INVENTION

In one aspect, the invention features, in general, a molding process for forming a shaving system having the step of placing one or more of the blades into a first mold cavity. A first generally rigid polymer is injected into the first mold cavity to form a housing and secure the blades. A second generally rigid polymer is injected into a second mold cavity to form a handle that is spaced apart from the housing of the first mold cavity. A generally flexible polymer is injected into a third mold cavity to interconnect the housing and the handle, such that the generally flexible polymer forms a gripping portion on the handle and a resilient skin contacting element between the housing and the handle.

In another aspect, the invention features, in general, a molding process for forming a shaving system having the step of placing a housing having one or more blades into a first mold cavity. A generally rigid polymer is injected into a second mold cavity to form a handle. A generally flexible polymer is injected into a third mold cavity to interconnect the housing and the handle, such that the generally flexible polymer forms a gripping portion on the handle and a resilient skin contacting element between the housing and the handle. If, desired, particular embodiments may optionally include a step of joining a lubricating strip to the housing after the housing is interconnected to the handle.

In yet another aspect, the invention features, in general, a molding process for forming a shaving system comprising the step of placing a housing having one or more of the blades into a first mold cavity. A handle is placed into the first mold cavity adjacent to and spaced apart from the housing. A generally flexible polymer is injected into the first mold cavity to interconnect the housing and the handle, such that the generally flexible polymer forms a resilient skin contacting element between the housing and the handle. If, desired, particular embodiments may optionally include the step of joining a lubricating strip to the housing after the housing is interconnected to the handle.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings.

DETAILED DESCRIPTION OF THE INVENTION

Figure 1:
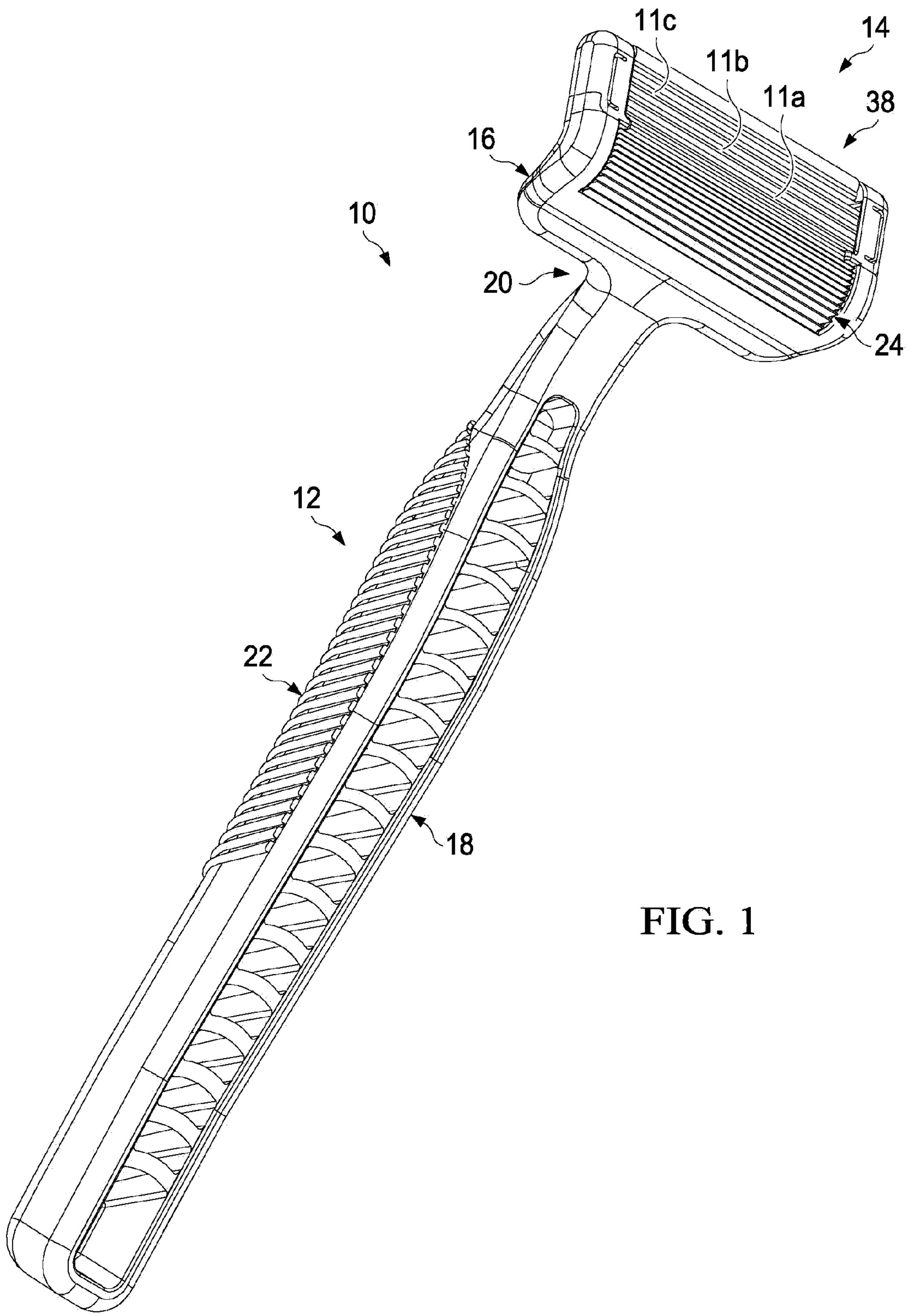
FIG. 1 is a perspective view of one possible embodiment of a shaving system.

Referring to FIG. 1, one possible embodiment of a shaving system 10 having a handle 12, a cartridge or housing 14, and an elastomeric member 16 is shown. The housing 14 may carry one or more blades for shaving or trimming hair on the surface of skin. The housing 14 may be fixed or pivotably movable relative to the handle 12. In certain embodiments, the handle 12, the housing 14, and the elastomeric member 16 may form an integral unit, which may be replaced when the consumer is no longer satisfied with the shaving performance of the shaving system 10. Alternatively, the blades 11 and/or the housing 14 may be mounted detachably to the handle 12 to enable the blades 11 and/or the housing 14 to be replaced when the blade sharpness has diminished to an unsatisfactory level. The handle 12 may be designed to provide the housing 14 with good access to all shaving areas, particularly tight shaving areas (i.e., under the nose and around areas of the chin), by generally directing the handle 12 away from the housing 14. The handle 12 may include a body 18 with an enlarged proximal end portion 20. The elastomeric member 16 may have a gripping portion 22 molded to the body 18 of the handle 12. The gripping portion 22 may include a plurality of ribs or recesses to improve the user's grip of the handle 12, especially in a wet environment. As will be explained in greater detail below, the elastomeric member 16 may be molded to the enlarged proximal end portion 20 of the handle 12 to join or interconnect the housing 14 and the handle 12, as well as facilitate pivoting of the housing 14 relative to the handle 12.

Stretching the skin during shaving is believed to enhance the performance of the shaving system 10, for example, by minimizing excessive bulging of skin between blades 11. The elastomeric member 16 may include a resilient skin contacting element 24 that interconnects or joins the handle 12 and the housing 14. The resilient skin contacting element 24 may be positioned in front of the blades 11 to aid in stretching the skin during shaving. The housing 14 may also include a cap 38 for contacting the skin behind the blades 11 during shaving. The resilient skin contacting element 24 may be multi-functional, for example, it may directly connect the handle 12 to the housing 14, facilitate pivoting of the housing 14 and provide enhanced skin stretching during shaving.

The resilient skin contacting element 24 facilitates the preferred movement of housing 14 relative to the handle 12 without a multi-piece mechanical pivoting system such as those that use cam-followers. This configuration can reduce the number of pieces required and associated manufacturing steps. Another advantage of the resilient skin contacting element 24 facilitating the preferred movement of housing 14 is that the shaving system 10 may be used numerous times without fatiguing or breaking. Systems that utilize living hinge designs are typically made out of a generally rigid polymers, such as polypropylene, which have inferior elongation properties compared to elastomers. The resilient skin contacting element 24 also allows for a less restricted pivot motion compared to other designs, thus allowing the user to control the pivot motion of the shaving system, as desired. The resilient skin contacting element 24 may also provide smoother pivoting motion of housing 14 by eliminating the mechanical losses associated with multi-piece mechanical pivoting systems.

Figure 2:
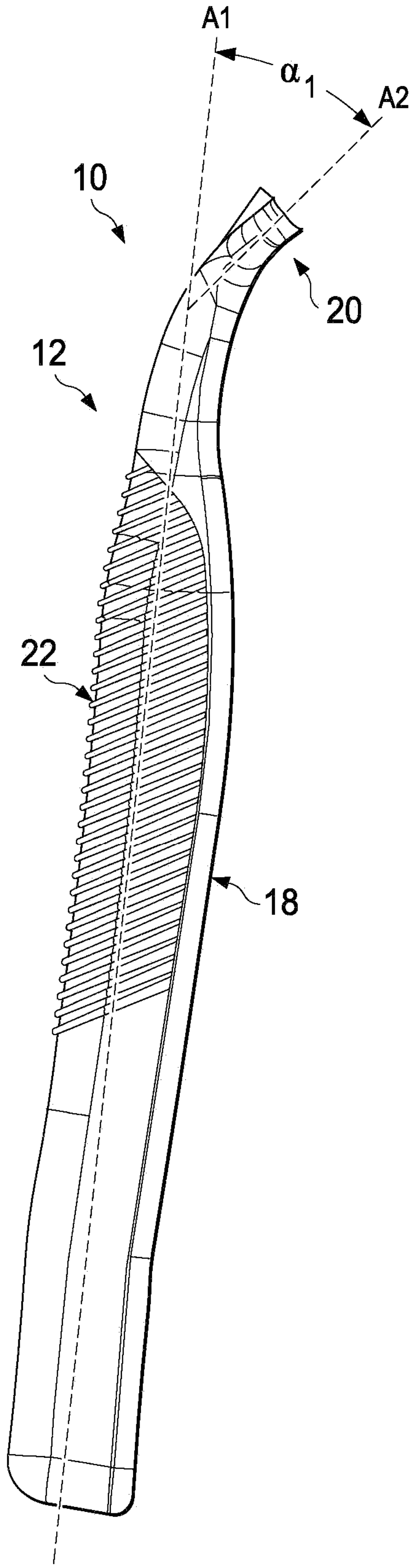
FIG. 2 is a partial side view of the shaving system of FIG. 1.

Referring to FIG. 2, a partial side view of the shaving system 10 is shown with the housing 14 and resilient skin contacting element 24 removed for clarity. The body 18 of the handle 12 may have a longitudinal axis A1, however, it is understood that the body 18 and the longitudinal axis A1 need not be straight. In certain embodiments, the body 18 of the handle 12, and thus the longitudinal axis A1, may have a gentle or subtle curve. The enlarged proximal end portion 20 may have a longitudinal axis A2 that is offset at a fixed angle from the longitudinal axis A1 by an angle $\alpha_1$. In certain embodiments, enlarged proximal end portion 20 of the handle 12, and thus the longitudinal axis A2, may also have a gentle or subtle curve. The angle $\alpha_1$ may slant the handle 12 away from the area of the skin being shaved, which may provide a more comfortable shaving position for the user. The angle $\alpha_1$ may vary depending on the application of the shaving system 10, for example, the optimal range for angle $\alpha$1 may be different for shaving the face than the legs. The angle $\alpha_1$ may be about 10 degrees, 15 degrees, or 20 degrees to about 30 degrees, 40 degrees or 50 degrees.

Figure 3A:
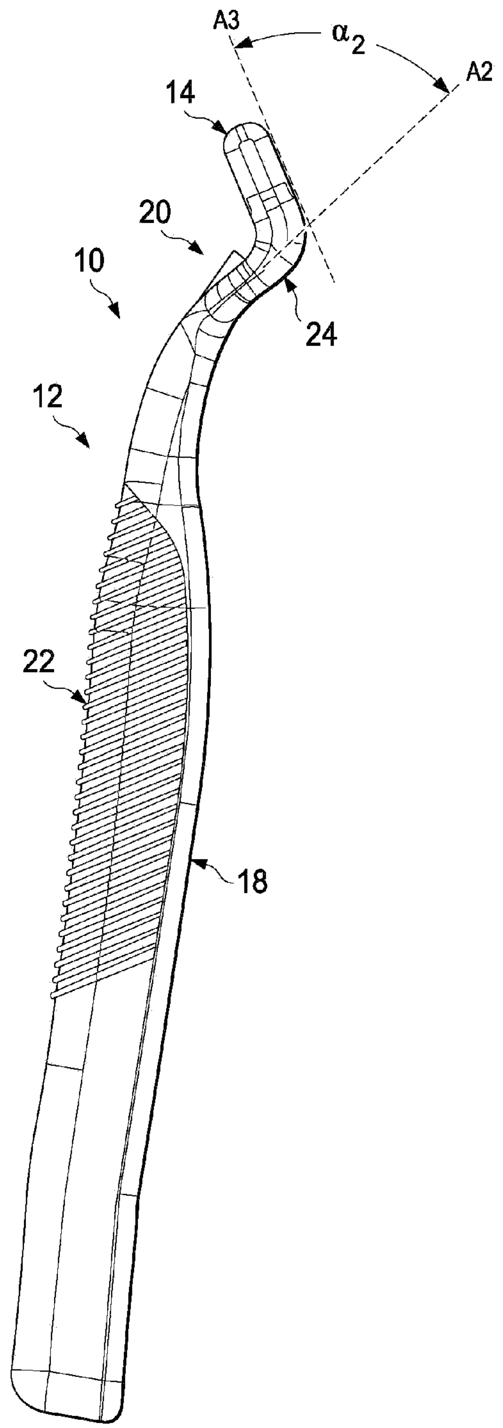
FIG. 3A is a side view of the shaving system of FIG. 1 in a neutral pivot position.
Figure 3B:
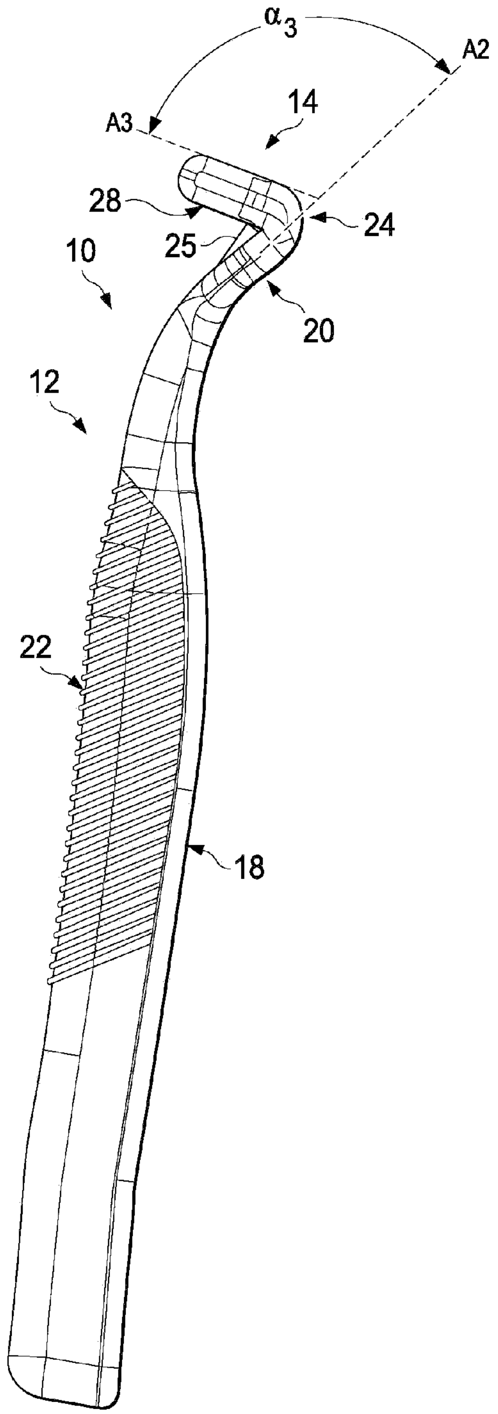
FIG. 3B is a side view of the shaving system of FIG. 1 in a first flexed pivot position.

Referring to FIGS. 3A and 3B, a side view of the shaving system 10 is shown with the housing 14 in a neutral pivot position and a flexed pivot position, respectively. The housing 14 may have a longitudinal axis A3 that is offset from the longitudinal axis A2 of the enlarged proximal end portion 20 of the handle 12 by an angle $\alpha_2$. The longitudinal axis A3 may also represent a shaving plane (e.g., the plane that contacts the surface of the skin during shaving). The angle $\alpha_2$ may vary depending on the application of the shaving system 10, for example, the optimal range for angle $\alpha_2$ may be different for shaving the face than that for the legs. Angle $\alpha_2$ may be about 35 degrees, 45 degrees, or 55 degrees to about 65 degrees, 75 degrees or 85 degrees. The user may pivot the handle 12 relative to the housing 14 during shaving, which may flex or bend the resilient skin contacting element 24 to increase angle $\alpha_2$.

The pivoting of the housing 14 relative to the handle 12 allows the housing to follow the contours of the skin and reach tighter areas. FIG. 3B shows the longitudinal axis A3 pivoted further away from the longitudinal axis A2 of the enlarged proximal end portion 20 of the handle 12, resulting in a flexed pivot position of the housing 14. The flexed pivot position of the housing 14 may result in the longitudinal axis A3 being offset from the longitudinal axis A2 by an angle $\alpha_3$ of about 80 degrees, 90 degrees or 100 degrees to about 130 degrees, 140 degrees or 160 degrees. Angle $\alpha_3$ may be greater than angle $\alpha$2 to provide a range of movement of the housing 14, for example, the larger the difference between the two angles, the greater the range of motion of the housing 14. In certain embodiments, angle $\alpha$3 may be greater than angle $\alpha$2 by about 30 degrees, 40 degrees, or 11 degrees to about 60 degrees, 90 degrees, or 125 degrees.

The enlarged proximal end portion 20 may have a stop surface, such as a abutment member 25 that contacts a bottom surface 28 of the housing 14 to prevent the housing from further pivoting. The abutment member 25 may prevent the housing 14 from over pivoting and applying too much stress on the resilient skin contacting element 24, which may result in tearing of the resilient skin contacting element 24 or a loss in flexible properties. The abutment member 25 may also provide a predetermined pivot range to ensure the housing 14 remains in proper contact with the skin during shaving. The housing 14, the handle 12, and the resilient skin contacting element 24 may be molded to maximize or minimize angle $\alpha 2$. For example, angle $\alpha 2$ may be minimized to increase how much the housing 14 pivots before contacting a stop surface, such as the abutment member 25.

Figure 3C:
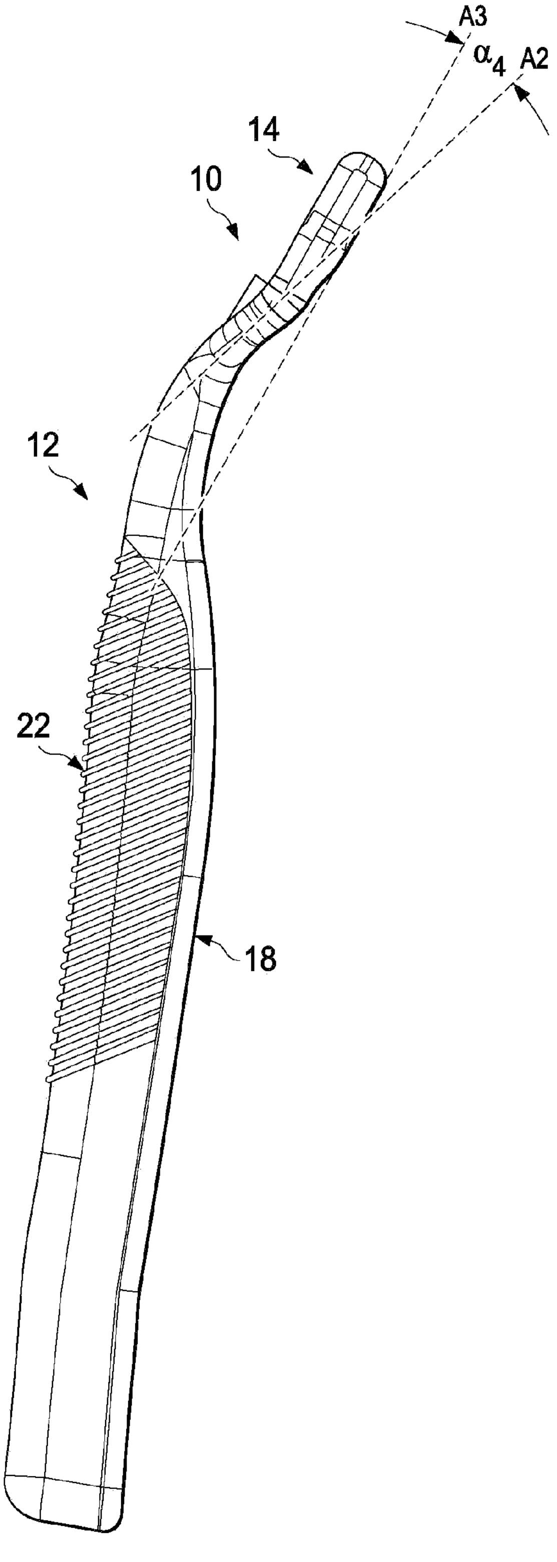
FIG. 3C is a side view of the shaving system of FIG. 1 in second flexed pivot position.

Referring to FIG. 3C, a side view of the shaving system 10 is shown in a second flexed pivot position. The housing 14 may pivot from the neutral pivot position (as shown in FIG. 3A) in a first direction resulting in the flexed positioned shown in FIG. 3B or the housing 14 may pivot in an opposite direction resulting in the second flexed position, as shown in FIG. 3C. The user may pivot the handle 12 during shaving, to follow the contours of the skin (e.g., face, neck, or legs) and reach tighter areas or the user may pivot the handle 12 in an opposite direction to utilize a separate trimmer blade (not shown) on the housing 14. In the second flexed position, the longitudinal axis A3 may be offset from the longitudinal axis A2 by an angle $\alpha_4$ of about 0 degrees, 3 degrees or 5 degrees to about 7 degrees, 10 degrees, or 15 degrees. In certain embodiments, the longitudinal axis A3 may even be parallel or in line with longitudinal axis A2. Alternative embodiments may include the shaving system 10 molded in a neutral pivot position having the angle $\alpha_4$ instead of the angle $\alpha_2$, depending on the desired movement of the housing 14.

Figure 4:
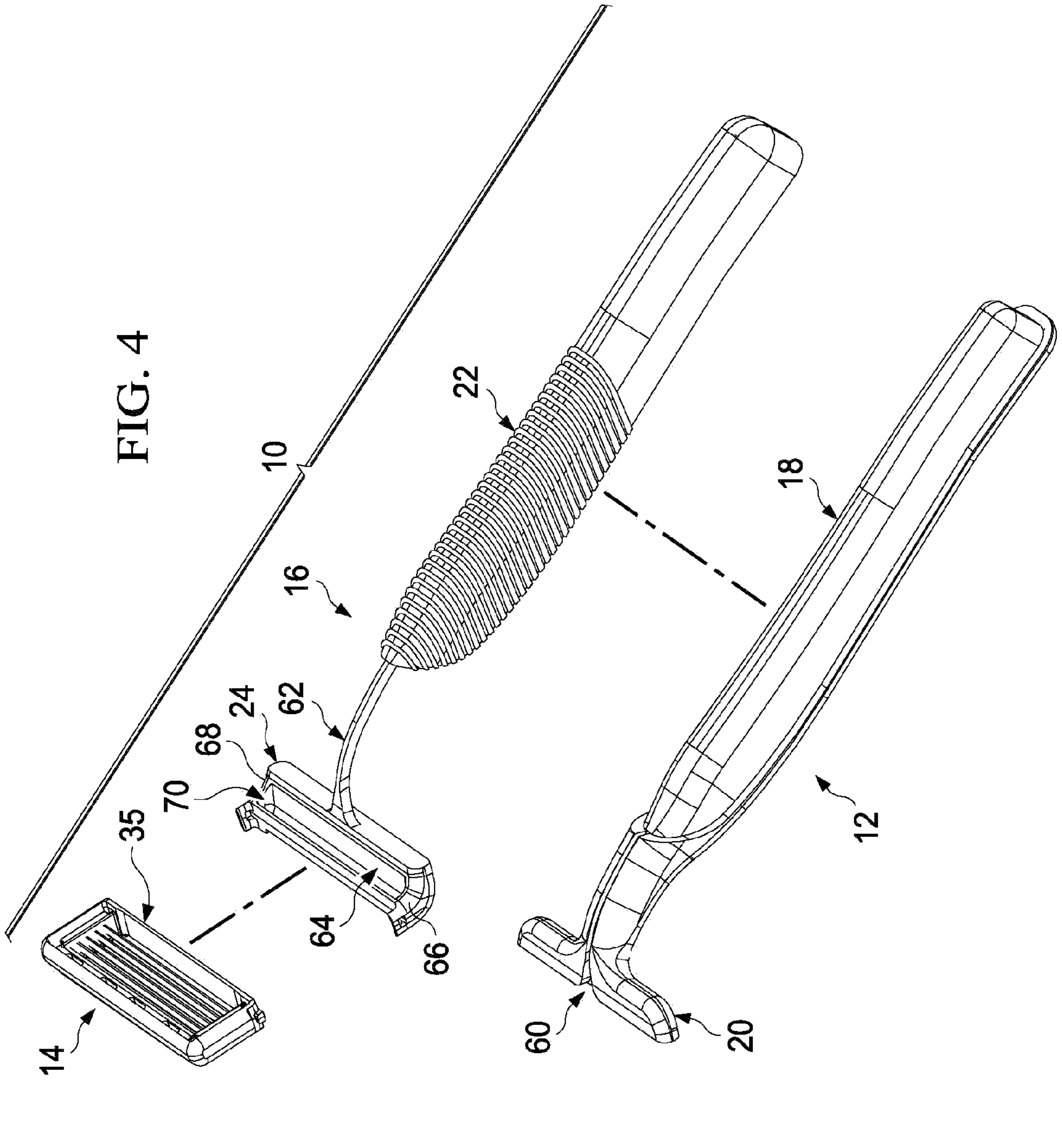
FIG. 4 is a perspective assembly view of the shaving system of FIG. 1.

Referring to FIG. 4, a perspective assembly view of the shaving system 10 is shown. The shaving system includes the elastomeric member 16, which may be molded to the housing 14 and the handle 12 to form an integral unit. One end of the resilient skin contacting element 24 of the elastomeric member 16 may be molded to a front face 35 of the housing 14 and another end of the resilient skin contacting element 24 may be molded to the enlarged proximal end portion 20 of the handle 12. The gripping portion 22 of the elastomeric member 16 may be molded to the body 18 of the handle 12. The enlarged proximal end portion 20 of the handle 12 may have a generally "T" shaped profile with a channel 60 that extends into the enlarged proximal end portion 20 and longitudinally along the body 18 of the handle 12. The elastomeric member 16 may have a neck portion 62 connecting the resilient skin contacting element 24 and the gripping portion 22, so the resilient skin contacting element 24 and the gripping portion 22 can be molded as a single component. The neck portion 62 may be molded within the channel 60 of the handle 12 to facilitate the joining of the elastomeric member 16 to the handle 12.

A bottom surface 64 of the resilient skin contacting element 24 may define a gap or recess 70 that is generally parallel to the front face 35 of the housing 14. The recess 70 may extend along about 30%, 40%, or 11% to about 60%, 75%, or 100% of the bottom surface 64 of the resilient skin contacting element 24. The recess 70 may define and control the pivot motion of the housing 14 relative to the handle 12 by providing an area of increased flexibility. The recess 70 may be positioned between a first frame member 66 and a second frame member 68 of the resilient skin contacting element 24. The first and second frame members 66 and 68 may provide a return force to bias the attached housing 14 in a predetermined position (i.e., neutral pivot position). The width of the frame members 66 and 68 may be increased or the width of the recess 70 may be decreased to provide a greater return force.

Figure 5:
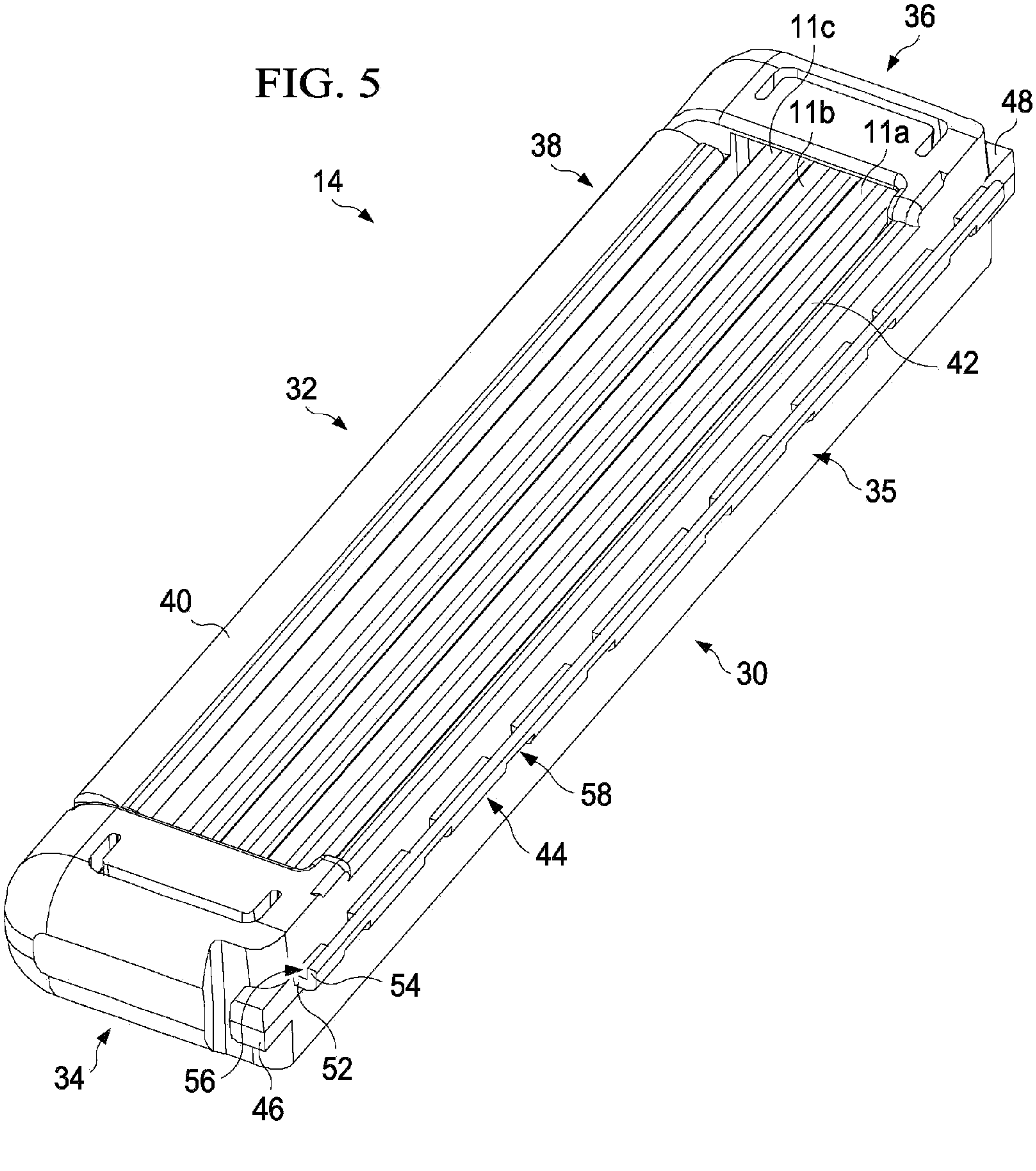
FIG. 5 is perspective view of one possible embodiment of a housing which may be incorporated into the shaving system of FIG. 1.

Referring to FIG. 5, a perspective view of one possible embodiment of the housing 14 is illustrated. The housing 14 may have a distal end portion 30, a proximal end portion 32, a first lateral end portion 34, and a second lateral end portion 36. The housing 14 may include a cap 38 for contacting the skin behind the blade(s) 11 during shaving. The cap 38 may be disposed at the proximal end portion 32 of the housing 14 and may include a lubricating strip 40. The lubricating strip 40 may be molded or extruded from the same material as the housing 14 or may be molded or extruded from a more lubricious material that has a water-leachable shaving aid composition to provide increase comfort during shaving.

The housing 14 may be dimensioned to receive the one or more blades 11*a*, 11*b*, and 11*c*. The blades 11*a*, 11*b*, and 11*c* may be mounted to the housing 14 in front of the cap 38. Although three blades 11*a*, 11*b* and 11*c* are shown, it is understood that more or less blades may be disposed within the housing 14. The blades 11*a*, 11*b*, and 11*c* may be molded within the housing 14, however, other assembly methods known to those skilled in the art may also be used to secure the one or more blades 11*a*, 11*b*, and 11*c* to the housing 14 including, but not limited to clips, wire wrapping, cold forming, hot staking, and adhesives. Alternatively, the blades 11*a*, 11*b*, and 11*c* may be inserted into the housing 14 as a blade unit that can be removed and replaced as the blades 11*a*, 11*b*, and 11*c* become dull. A skin contacting bar 42 may be disposed at the distal end portion 30 of the housing 14 in front of the first blade 11*a*. In certain embodiments, the skin contacting bar 42 may have a lubricous surface to improve the gliding properties of the housing 14 during shaving. In certain embodiments, the skin contacting bar 42 may also include a lubrication strip, similar to the lubrication strip 40 as previously described.

An interlock member 44 may extend along the front face 35 of the distal end portion 30 of the housing 14. The interlock member 44 may be generally rigid to facilitate the proper attachment of resilient skin contacting element 24 (not shown) to the housing 14. The resilient skin contacting element 24 (not shown) may bond chemically and/or mechanically to the interlock member 44 and/or the housing 14. For example, polypropylene provides a strong chemical bond with styrene ethylene butadiene styrene (SEBS) TPEs (e.g., Kraton). The interlock member 44 and/or the housing 14 may include features such as recesses, projections, channels or openings to enhance bonding by increasing the bonding surface area or by creating mechanical interlocks. In certain embodiments, the interlock member 44 may have a bottom wall 52 that projects away from the front face 35 and a front wall 54 that is generally transverse to the bottom wall 52. The front wall 54 may project upward toward the guard bar 42 to resist downward forces applied to the resilient skin contacting element 24 during shaving. The front wall 54 may be spaced apart from the front face 35, such that a gap 56 is provided between the front wall 54 and the front face 35. The interlock member 44 may have one or more channels 58 that extend through the bottom wall 52 and/or the front wall 54. The gap 56 and channels 58 of the interlock member 44 may facilitate the material of the resilient skin contacting element 24 (not shown) to flow in and around these features during molding and, once solidified, mechanical interlocks may be formed between housing 14 and the resilient skin contacting element 24. In addition to the interlock member 44, the distal end portion 30 of the housing 14 may have one or more attachment tabs 46 and 48 disposed at each of the lateral end portions 34 and 36 of the housing 14 to provide additional support to secure the resilient skin contacting element 24. The attachment tabs 46 and 48 may further aid in securing the resilient skin contacting element 24 (not shown) to the housing 14 by providing mechanical interlocks or an increased surface area for bonding of the resilient skin contacting element 24. The interlock member 44 and the attachment tabs 46 and 48 may facilitate the fastening of housing 14 to the resilient skin contacting element 24, such that the housing 14 and resilient skin contacting element 24 do not become separated or tear apart during shaving.

Figure 6:
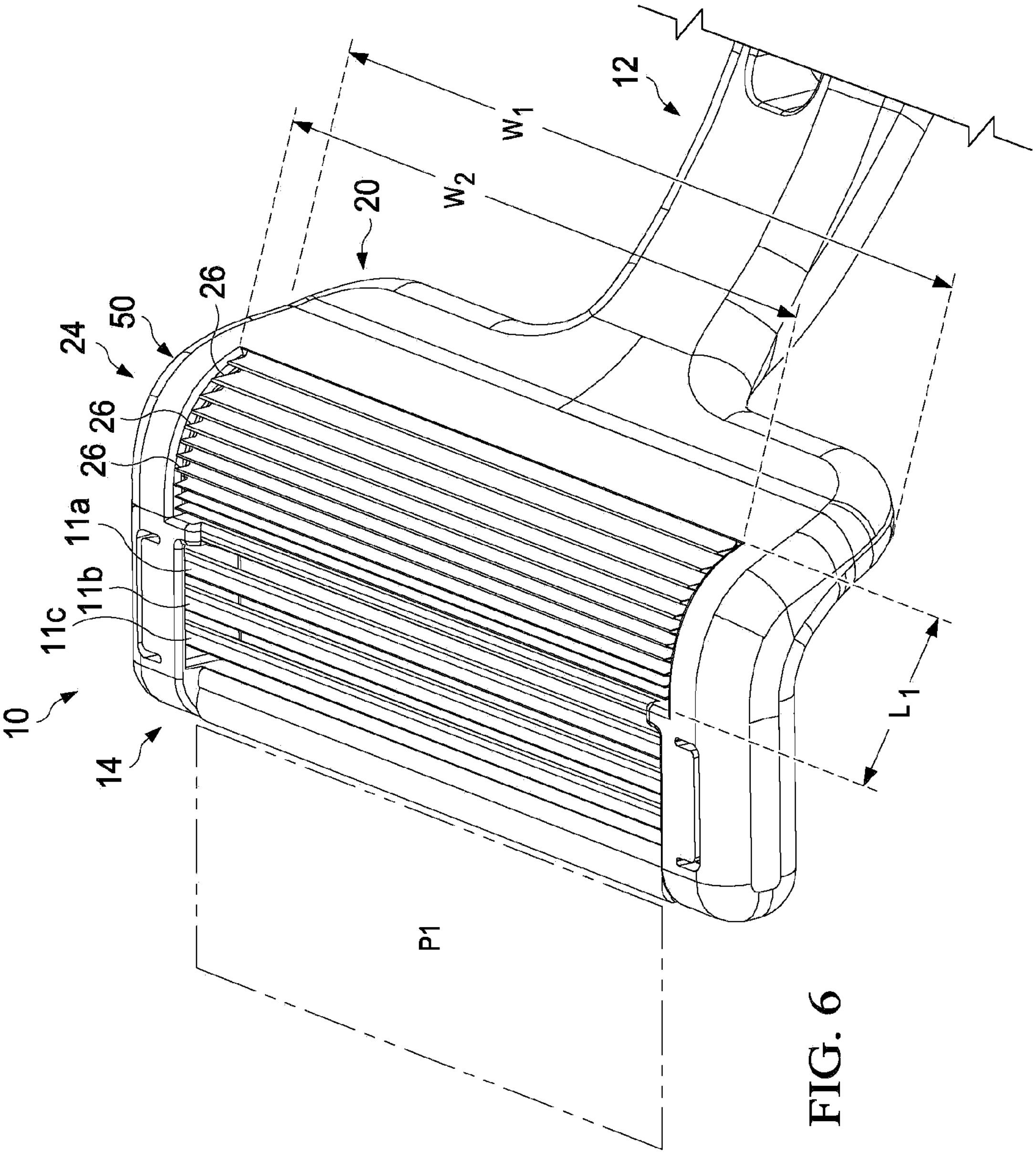
FIG. 6 is an enlarged partial perspective view of the shaving system of FIG. 1.

Referring to FIG. 6, a partial perspective view of the shaving system 10 is shown. The resilient skin contacting element 24 is configured to provide an optimal movement of the housing 14, (i.e., cutting, plane P1 of blades 11). Generally, the resilient skin contacting element 24 is designed to maximize the pivoting of housing 14 as close as possible to the cutting plane P1 of the blades 11*a*, 11*b*, and 11*c* during shaving. As a result, as the shaving system 10 is moved across the user's skin, the blades 11*a*, 11*b*, and 11*c* are kept in generally continuous contact with the user's skin, e.g., prevented from rolling off the skin, to provide continuous skin stretching and a more effective shave.

The resilient skin contacting element 24 may have a generally convex profile that curves down and away from the housing 14, which may enhance skin stretching, especially in contoured regions of the face and body (e.g., neck and under the arms). The elastic nature of skin allows it to conform, i.e., wrap around, the curved profile of skin the resilient skin contacting element 24. As the shaving system 10 is moved across the surface of a user's skin, the skin is stretched from the translational motion of the resilient skin contacting element 24. The resilient skin contacting element 24 facilitates the pivoting of the handle 12 relative to the housing 14, as the shaving system 10 continues across the skin. The pivoting of the handle 12 may cause the resilient skin contacting element 24 to flex and bend, which may further stretch the skin. The enlarged proximal end portion 20 of the handle 12 may extend along a substantial width of the resilient skin contacting element 24. The resilient skin contacting element 24 and the enlarged proximal end portion 20 may have generally the same width to facilitate a more controlled pivoting motion (i.e., reduce twisting or rotation of the housing 14 relative to the handle 12). The enlarged proximal end portion 20 may have a width $w_1$ of about 20 mm, 25 mm, or 30 mm to about 11 mm, 60 mm, or 70 mm. In certain embodiments, the width $w_1$ may be about 60%, 70%, or 80% to about 85%, 90%, or 100% of the overall width of the resilient skin contacting element 24 to maximize the surface area for the resilient skin contacting element 24 to bond to during molding.

One or more protrusions 26 may be disposed along a generally arcuate (i.e., convex) top surface 50 of the resilient skin contacting element 24 to enhance the stretching of the skin. The protrusions 26 may extend generally parallel to the blades 11*a*, 11*b*, and 11*c* along a second width $w_2$ of the resilient skin contacting element 24. The second width $w_2$ may be about 60%, 70%, or 80% to about 85%, 90%, or 100% of the overall width of the resilient skin contacting element 24 to maximize skin stretching. In certain embodiments, $w_2$ may be about 20 mm, 25 mm, or 30 mm to about 40 mm, 11 mm, or 60 mm. The protrusions 26 may also be spaced apart from each other along a length $L_1$ of the resilient skin contacting element 24, generally perpendicular to the blades. In certain embodiments, $L_1$ may extend along about 60%, 70%, or 80% to about 85%, 90%, or 100% of the overall length of the resilient skin contacting element 24 to maximize skin stretching. In certain embodiments, $L_1$ may be about 3 mm, 5 mm, or 7 mm to about 8 mm, 10 mm, or 12 mm. The protrusions 26 can have different sizes, shapes and geometries. For example, the elastomeric protrusions 26 can be in the form of nubs or fin segments that are spaced apart or interconnected. The protrusions 26 may extend in an upward direction, such that they are oriented parallel to each other. The elastomeric protrusions may also have different patterns or may be oriented at different angles with respect to the blades, i.e., in zigzag, chevron, herringbone or checkerboard patterns. Alternatively, the protrusions 26 may be defined as an area of the resilient skin contacting element 24 that circumscribes one or more recesses or depressions in the resilient skin contacting element 24.

Figure 7A:
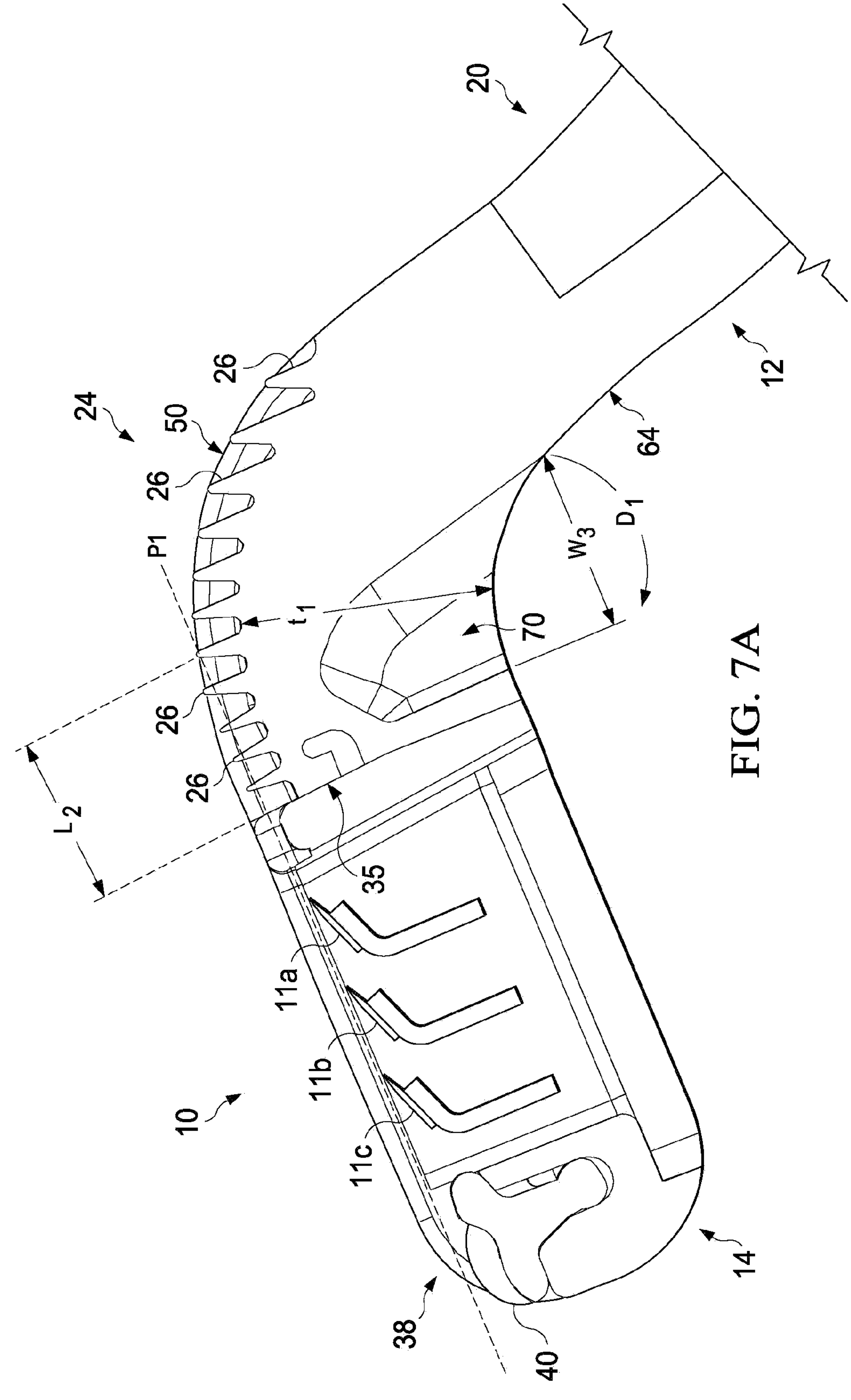
FIG. 7A is an enlarged cross section view of the shaving system of FIG. 1 in the neutral pivot position.

Referring to FIG. 7A, a cross sectional side view of the shaving system 10 is shown in the neutral position, such that the housing 14 and the resilient skin contacting element 24 are positioned along the shaving plane P1 that is tangent to the resilient skin contacting element 24 and the cap 38 (shown with the lubricating strip 40). The shaving plane P1 is in contact with the surface of the skin during shaving, which allows the resilient skin contacting element 24 to stretch the skin in front of the blades 11 and the lubricating strip 40 to apply shaving aid behind the blades 11*a*, 11*b*, and 11*c*. In certain embodiments, the shaving system 10 may be molded in the neutral pivot position such that the resilient skin contacting element 24 biases the housing 14 toward the neutral position during shaving. The enlarged proximal end portion 20 of the handle 12 may be spaced apart (i.e., not in direct contact) from the housing 14 to facilitate a smooth pivot motion of the housing 14 relative to the handle 12. The bottom surface 64 of the resilient skin contacting element 24 that defines the recess 70 may define a pivot zone of the housing 14 relative to the handle 12. The pivot zone may be in front of the first blade 11*a* and below the plane P1. The recess 70 may be positioned in various locations along the bottom surface 64 depending on the desired pivot motion of the shaving system. For example, positioning the recess 70 closer to the housing 14 (as shown) facilitates the pivoting of the shaving system 10 closer to the blades 11*a*, 11*b*, and 11*c*.

The recess 70 and the spacing between the housing 14 and the enlarged proximal end portion 20 may be selected to provide a balance of flexibility and control of the wet shaving unit 10. For example, if the recess 70 is too narrow or if the enlarged proximal end portion 20 and the housing are space too close together, then the resilient skin contacting element 24 may not have sufficient flexibility to adequately pivot the housing 14 relative to the handle 12. If the shaving system 10 does not provide smooth and flexible pivoting, the user may need to increase the force applied to the housing 14 to effectuate the pivoting of the housing 14 relative to the handle 12. The housing 14 should glide across the surface of the skin with minimal downward pressure against the skin to minimize nicks and cuts. The flexibility of the resilient skin contacting element 24 may be increased to decrease the force required to pivot the housing 14. As will be described in greater detail below, the resilient skin contacting element 24 may comprise a material with a low Shore A hardness and/or a high percent elongation. Furthermore, the length and width of the recess 70 may also be increased to decrease the force required to pivot the housing 14. The resilient skin contacting element 24 should have sufficient stiffness to provide the user with proper control. In certain embodiments, the recess 70 may have a width $w_3$ of about 0.5 mm, 1 mm, or 2 mm to about 3 mm, 4 mm, or 5 mm to provide sufficient flexibility and control. A thickness $t_1$ of the resilient skin contacting element 24 may extend from the bottom surface 64 to a base of the closest protrusion 26. In certain embodiments, $t_1$ may be about 1 mm, 2 mm, or 3 mm to about 4 mm, 5 mm or 6 mm.

The thickness $t_1$ at the gap 70 may be reduced by about 20%, 40%, or 50% to about 70%, 80%, or 90%.

Generally, a cartridge or blade housing with a skin stretching member with an increased surface area provides for increased skin stretching, and thus a closer and more comfortable shave. Larger skin stretching members increase the overall size of the cartridge, making it difficult for the user to shave in and around tighter areas. Shaving razors that are provided with larger skin stretching elements to optimize skin stretching may not be very effective in shaving relatively small shaving areas, such as under the nose. Conversely, a cartridge having a skin stretching member or guard with a decreased surface area may provide the user with access to relatively tight shaving areas, but may not sufficiently stretch the skin. Shaving razors must typically compromise between a shaving unit having a smaller skin stretching member in order to reach tighter shaving areas and a larger skin stretching member with that provides superior skin stretching properties. Without being limited by theory, it is believed that the resilient skin contacting element 24 of the shaving system 10 may have multiple positions that allow the user to maximize or minimize the effective length (i.e., direction transverse to the blades 11*a*, 11*b*, and 11*c*) of the resilient skin contacting element 24 that is contact with the surface of the skin. The user may manipulate the shaving system 10 as needed to shave in tight areas, as well as provide superior skin stretching for a close and comfortable shave in more open areas.

The resilient skin contacting element 24 may allow the user to minimize the effective length of the shaving system 10 that is in contact with the surface of the skin and the thereby allow the shaving system 10 to be more effectively used in smaller shaving areas. The curved profile of resilient skin contacting element 24 may also facilitate the housing 14 being positioned in smaller shaving areas. The resilient skin contacting element 24 may also provide a return force to bias the housing 14 back to the neutral pivot position which may provide a larger effective length for improved skin stretching. The resilient skin contacting element 24 may have a first position (e.g., neutral pivot position) along the shaving plane P1, such that only a portion of the resilient skin contacting element 24 is in contact with the surface of the skin. The portion of the resilient skin contacting element 24 that is contact with the surface of the skin in the neutral position (i.e., before the user applies a pivot force to the handle 12) may be represented by a length $L_2$. In the neutral pivot position, the length $L_2$ may extend from the front face 35 of the housing 14 to one of the protrusions 26 that is in contact with the plane P1. In certain embodiments, $L_2$ may be about 1 mm, 2 mm, or 3 mm to about 5 mm, 6 mm or 7 mm.

Figure 7B:
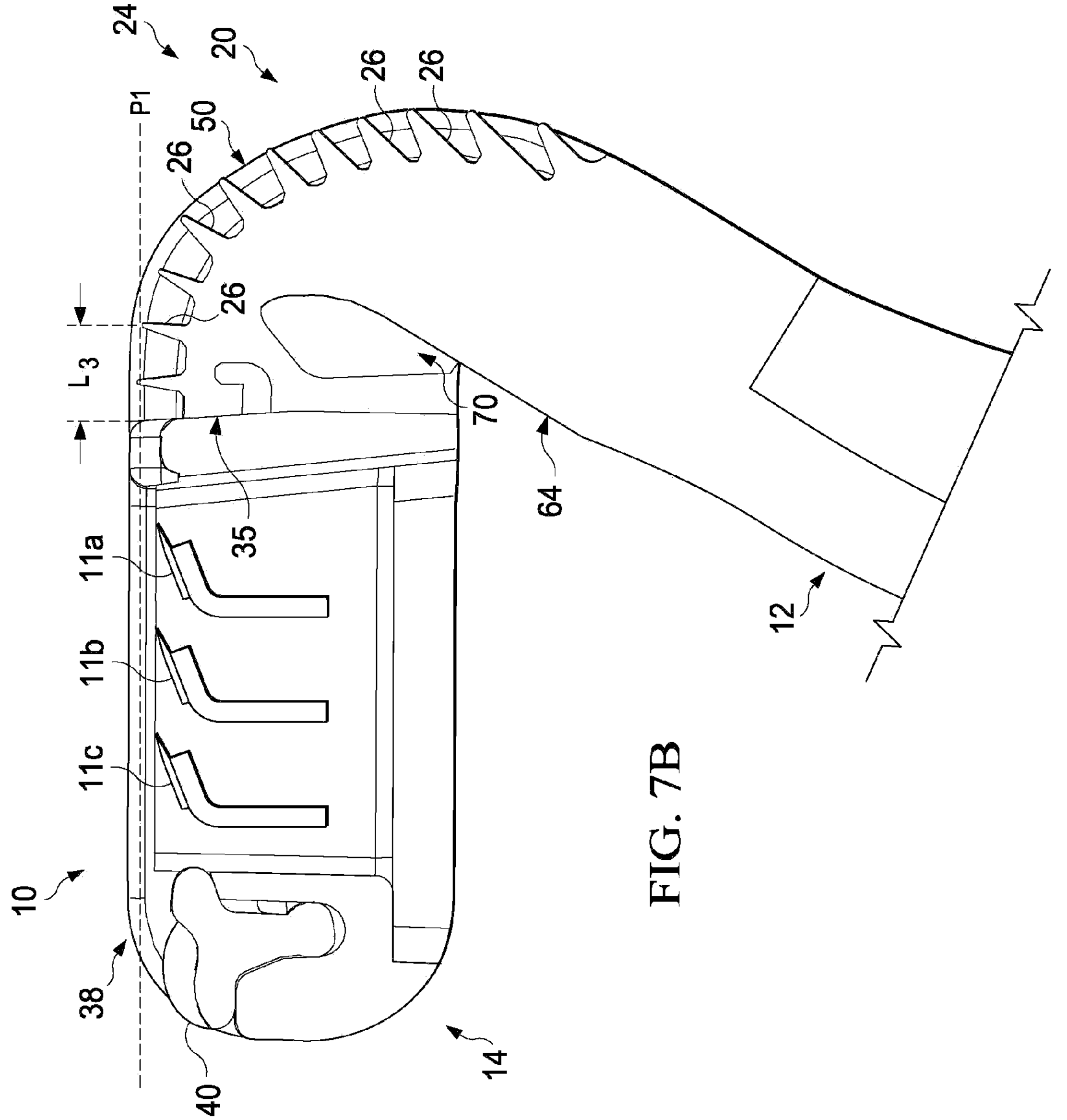
FIG. 7B is an enlarged cross section view of the shaving system of FIG. 1 in the first flexed pivot position.

The user may decrease $L_2$ by pivoting the handle 12 toward of the housing 14 and away from the surface of the skin so as to decrease the width $w_3$ of the recess 70 (as shown by the dashed arrow $D_1$ in FIG. 7A). The pivoting of the handle 12 may result in a flexed pivot position of the resilient skin contacting element 24 along the plane P1, as shown in FIG. 7B. The flexed pivot position may result in the bottom surface 64 folding over the recess 70 and contacting the housing 14. The flexed pivot position may result in the resilient skin contacting element 24 having a length $L_3$ that is in contact with the surface of the skin along the plane P1. In certain embodiments, the length $L_3$ may be about 0.25 mm, 0.5 mm, or 1 mm to about 1.5 mm, 2 mm, or 3 mm. The length $L_3$ may be about 10%, 20%, or 30% to about 40%, 11%, or 60% less than $L_2$, thereby effectively decreasing the size of the shaving system 10 that is in contact with the skin without sacrificing skin stretching.

Figure 8:
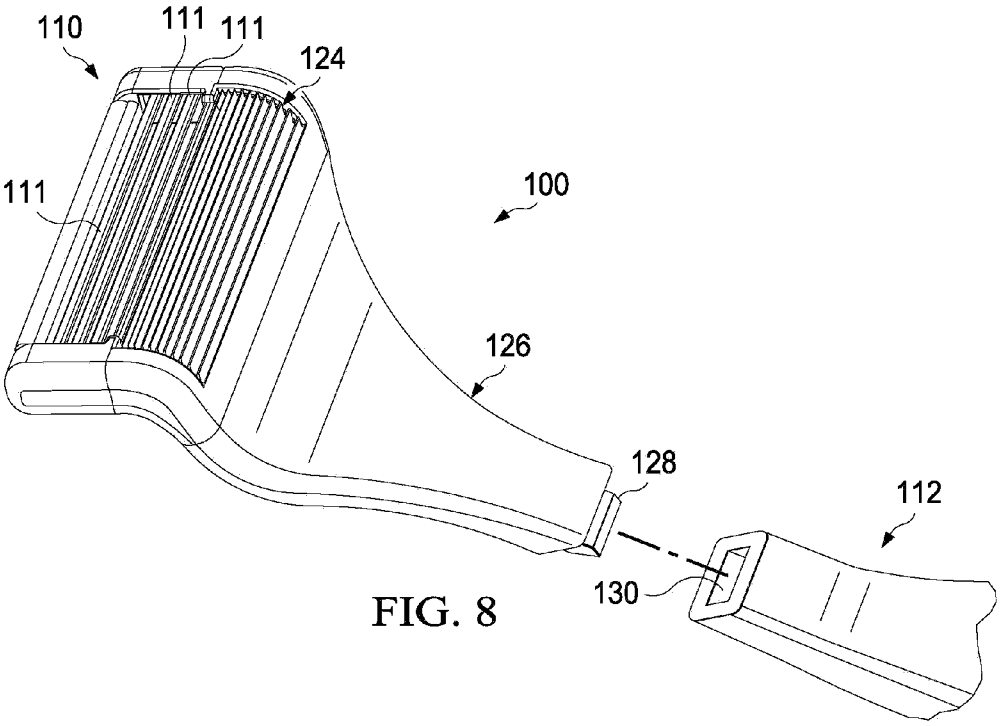
FIG. 8 is a partial perspective view of another possible embodiment of a shaving system.

FIG. 8 illustrates a perspective view of another possible embodiment of a shaving system 100. The shaving system 100 may be the same as or similar to the shaving system 10 described above. For example, the shaving system 100 may have handle 112, a resilient skin contacting member 124, and a housing 110 with one or more blades 111. However, the shaving system 100 may also include an interlocking element 126 joined to the resilient skin contacting member 124 that releasably engages the handle 112. The connection between element 126 and handle 112 can be anywhere along the length of the handle. Although the interlocking element 126 is shown as a tab member 128 that is received within a cavity 130 of the handle 112, other methods of connecting handles to cartridges are possible, such as those described in U.S. Pat. Nos. 4,413,411, 4,446,619, 5,787,586, 5,822,869, 5,956,851, and 6,026,577.

The shaving system 10 may be manufactured utilizing a continuous or semi-continuous molding process, as shown in FIGS. 9A-9D. A continuous molding process molds all of the components in-line to produce a finished product. A semi-continuous process may involve molding certain components in bulk and storing the components for later processing, such as additional molding steps. The molding process may include a first cavity 200 that molds the housing 14, a second cavity 202 that molds the handle 12, and a third cavity 204 that molds the elastomeric member 16. Although only one of each of the three cavities 200, 202 and 204 is shown, multiple cavities may be used depending on production needs. For example, the molding process may utilize sixteen or more of each of the first, second and third cavities 200, 202 and 204. It is also understood that although only a bottom half of the cavities 200, 202, and 204 are shown, the cavities 200, 202, and 204 have both a top half and a bottom half to form the final part.

Figure 9A:
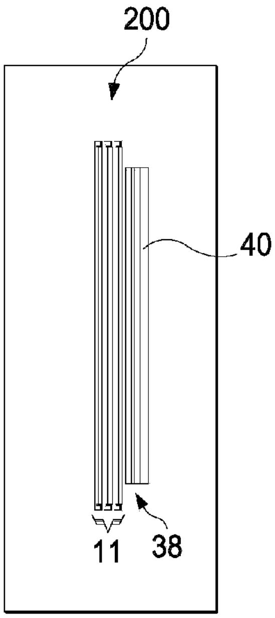
FIG. 9A is a top view of one possible embodiment of first cavity used in molding the shaving system of FIG. 1.
Figure 9B:
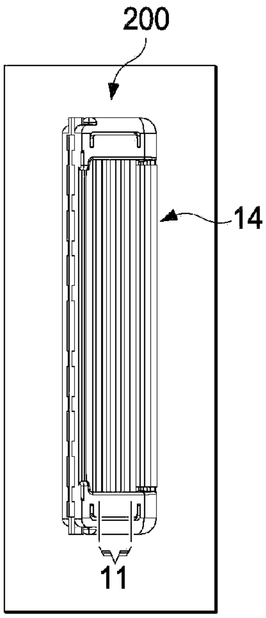
FIG. 9B is a top view of the housing of FIG. 5 molded in the first cavity of FIG. 9A.

The first step of the molding process may include placing the lubricating strip 40 and one or more of the blades 11 into the first cavity 200, as shown in FIG. 9A. The components may be inserted manually into the first cavity 200, or automated pick and place systems may be used. The cap 38 may be inserted into the cavity 200 as part of the lubricating strip 40 or may be formed when plastic is injected into the first cavity 200. A first generally rigid polymer may be injected into the first cavity 200 to form the housing 14 and secure the blades 11 and lubrication strip 40, as shown in FIG. 9B. Similar blade subassemblies methods are described in U.S. Pat. No. 6,852,262. Alternatively, the lubricating strip 40 may be assembled to the shaving unit 10 after the housing 14 is molded. In certain embodiments, in order to decrease costs, the cap 38 may be molded as part of the housing 14 and no lubricating strip 40 may be used. In other embodiments, a lubrication polymer material for the lubricating strip 40 may be co-injected molded into the first cavity 200.

Figure 9C:
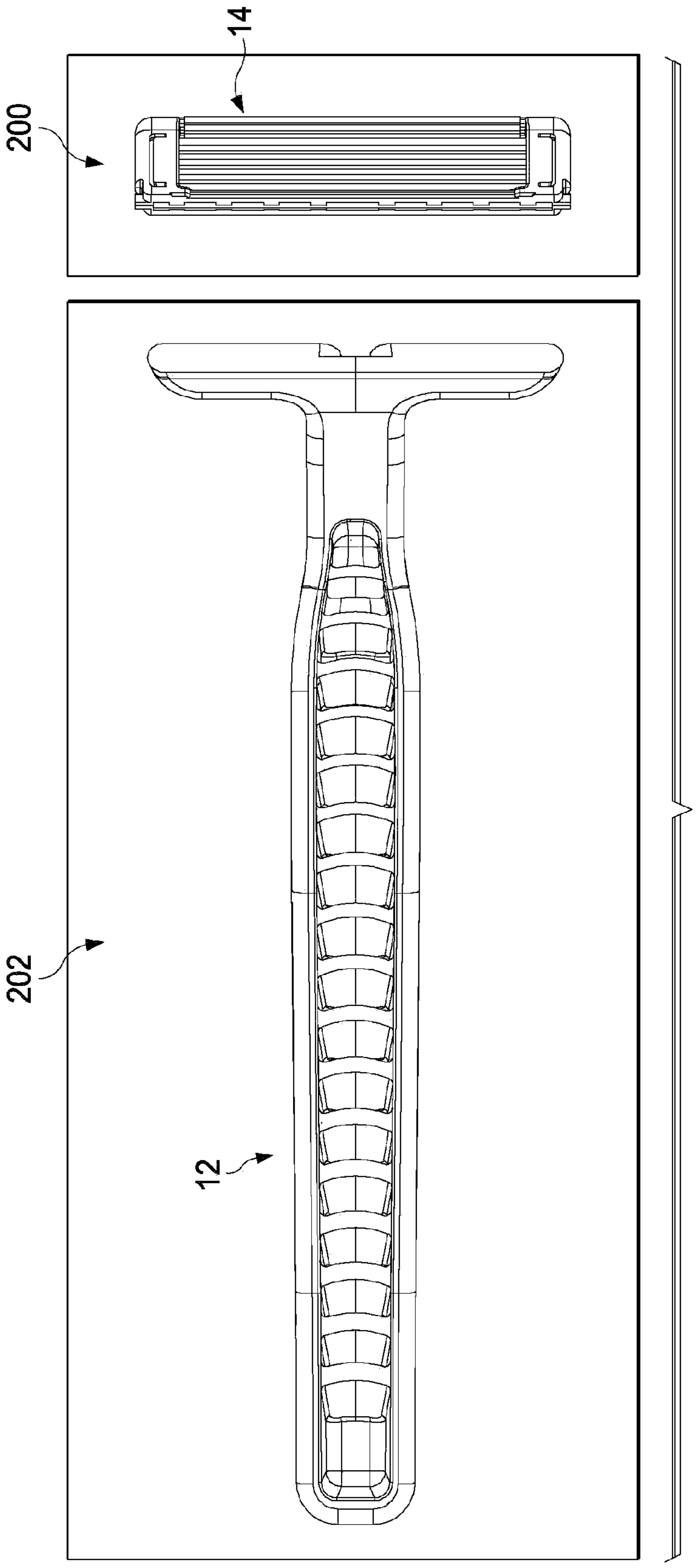
FIG. 9C is a top view of a handle molded in a second cavity and the housing molded in the first cavity.

As shown in FIG. 9C, a second generally rigid polymer may be injected into the second cavity 202 to form the handle 12, which is spaced apart from the housing 14. The second generally rigid polymer may be the same as the first generally rigid polymer and both polymers may be injected into the respective cavities sequentially or simultaneously. In certain embodiments, the color and/or the material of the first and second generally rigid polymers may be different to provide various aesthetic effects.

Figure 9D:
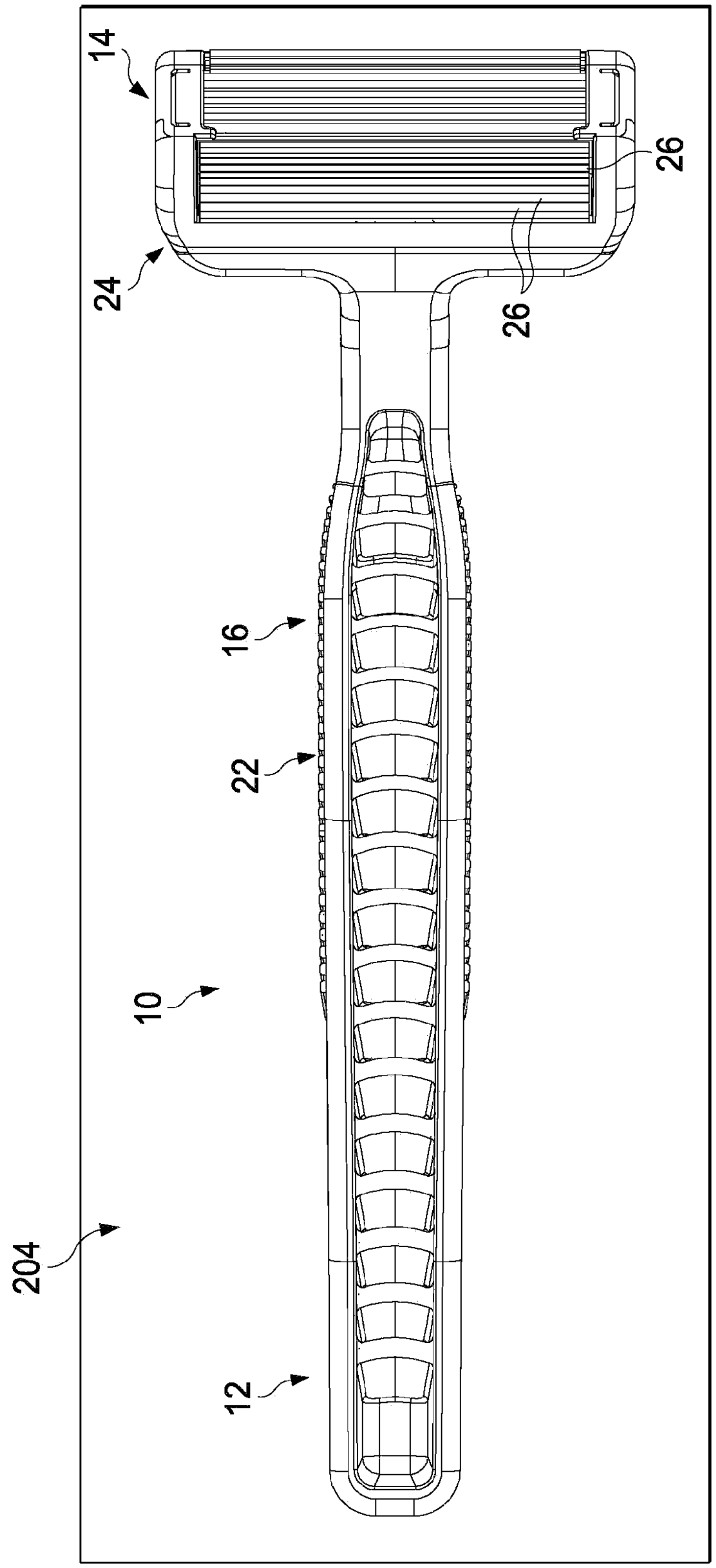
FIG. 9D is a top view of a third cavity molding an elastomeric member to the housing and the handle to form the shaving system of FIG. 1.

FIG. 9D shows a final step of the molding process. A generally flexible polymer, such as an elastomer, may be injected into the third cavity 204 to form the elastomeric member 16, such that the resilient skin contacting element 24 connects the handle 12 and the housing 14 to form the wet shaving unit 10. The generally flexible polymer may also form the gripping portion 22 of the handle 12 within the third cavity 204. The protrusions 26 of the resilient skin contacting element 24 may be oriented generally transverse to a top surface of the housing 14 (i.e., in the direction of pull for the cavity 204). The "direction of pull" refers to the motion of a part surface relative to a mold or cavity when the mold is opened for part ejection. The orientation of the plurality of protrusions 26 may facilitate the mold halves (cavities) to separate from the plastic parts allowing the shaving system 10 to be ejected without any obstructions from the mold cavities creating undercuts.

It is understood that the various steps illustrated above may be done in any order. In certain embodiments, the cap and/or lubricating strip 40 may be assembled to the housing 14 in bulk quantities and stored for later processing (e.g., molding the elastomeric member 16 and handle 12 to the housing). Another possible embodiment may include the handle 12 and the housing 14 being produced in bulk quantities, placing the handle 12 and housing 14 into one or more cavities of a mold, followed by injecting a flexible polymer into a cavity to form the elastomeric member 16, such that the resilient skin contacting element 24 connects the handle 12 and the housing 14. If desired, the lubricating strip may be assembled to the housing at a later step. This method creates flexibility in the manufacturing process by allowing the various components to be molded and assembled simultaneously and also allows for the components to be molded in bulk, stored, and/or shipped for later processing.

The housing 14 and the handle 12 may be manufactured from a generally rigid polymer, such as polypropylene, acrylonitrile butadiene styrene, or NORYL™ (a blend of polyphenylene oxide (PPO) and polystyrene developed by General Electric Plastics, now SABIC Innovative Plastics). The housing 14 and the handle 12 may also be molded from other semi-rigid polymers having a Shore A hardness of about 50, 60 or 70 to about 90, 110, or 120. The housing 14 and the handle 12 may be insert injection molded or co-injection molded to the resilient skin contacting element 24. Other known assembly methods may also be used such as adhesives, ultrasonic welding, or mechanical fasteners.

The elastomeric member 16 may be made from thermoplastic elastomers (TPEs) or rubbers; examples may include, but are not limited to silicones, natural rubber, butyl rubber, nitrile rubber, styrene butadiene rubber, styrene butadiene styrene (SBS) TPEs, styrene ethylene butadiene styrene (SEBS) TPEs (e.g., KRATON®), polyester TPEs (e.g., HYTREL®), polyamide TPEs (PEBAX®), polyurethane TPEs, polyolefin based TPEs, and blends of any of these TPEs (e.g., polyester/SEBS blend). In certain embodiments, the the elastomeric member 16 may comprise the thermoplastic elastomer compound DYNAFLEX® G6730 from GLS Corp. (a PolyOne business). The elastomeric member 16 may comprise other elastomeric materials that provide sufficient flexibility for the function of resilient skin contacting element 24. Such materials may have an elongation at break of about 300%, 500%, or 700% to about 800%, 1000%, or 1300% (ASTM D412-Die C, 2 hrs, 23° C.) A softer material may enhance skin stretching and provide a more pleasant tactile feel against the skin of the user during shaving, as well as decrease the force required to pivot the housing 14. A softer material may also aid in masking the less pleasant feel of the harder material of the housing 14 and blades 11 against the skin of the user during shaving.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm". In an effort to avoid any ambiguity, for the purposes of this disclosure, the term "portion" shall be construed as meaning less than about 45%. For example, the term "distal end portion" should be interpreted as from about 0%, 5%, 10%, or 15% to about 15%, 20%, 25%, 30%, 40%, or 45% from the terminal end of the element referenced. Similarly, the term "proximal end portion" should be interpreted as from about 0%, 5%, 10%, or 15% to about 15%, 20%, 25%, 30%, 40%, or 45% from the end opposite the terminal end of the element referenced.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A molding process for forming a wet shaving razor comprising the steps of:

placing one or more blades into a first mold cavity;

injecting a first generally rigid polymer into the first mold cavity to form a housing and secure the blades to the housing;

injecting a second generally rigid polymer into a second mold cavity adjacent and spaced apart from the housing of the first mold cavity to form a handle; and injecting a generally flexible polymer into a third mold cavity to interconnect the housing and the handle, wherein the generally flexible polymer forms a resilient skin contacting element between the housing and the handle wherein, the resilient skin contacting element is configured to stretch the skin immediately in front of the blade during a shaving stroke.

2. The molding process of claim 1 wherein a plurality of blades are placed into the first mold cavity.

3. The molding process of claim 1 wherein the two generally rigid polymers are injected simultaneously.

4. The molding process of claim 1 wherein the first and second generally rigid polymers are composed of the same polymer material.

5. The molding process of claim 1 wherein the first and second generally rigid polymers are composed of different polymer materials.

6. The molding process of claim 1 wherein the first and second generally rigid polymers have a different Shore A hardness.

7. The molding process of claim 1 wherein the generally flexible polymer is injected after the first or second generally rigid polymer.

8. The molding process of claim 1 wherein the generally flexible polymer has a Shore A hardness less than the first and second generally rigid polymers.

9. The molding process of claim 1 wherein a top surface of the resilient skin contacting element has a plurality of protrusions that are oriented generally transverse to the top surface to facilitate ejection of the wet shaving razor.

10. The molding process of claim 1 further comprising joining a lubricating strip to the housing.

11. The molding process of claim 1 wherein the lubricating strip is joined to the housing with a snap fit connection.

12. The molding process of claim 1 wherein the lubricating strip is joined to the housing with an adhesive.

13. The molding process of claim 1 further comprising placing a cap including a lubricating strip into the first mold cavity and injecting the first generally rigid plastic around the cap to secure the cap to the housing.

14. The molding process of claim 1 wherein injecting the generally flexible polymer forms a gripping portion of the handle.

15. The molding process of claim 1 wherein the first and second generally rigid polymers are different colors.

* * * * *